United States Patent [19]

Kita et al.

[11] Patent Number: 5,504,632
[45] Date of Patent: Apr. 2, 1996

[54] DIGITAL VTR THAT IS ALSO CAPABLE OF REPRODUCING A SIGNAL RECORDED WITH AN ANALOG VTR FORMAT

[75] Inventors: Mikio Kita; Ichitaro Sato; Kazuo Ido, all of Kanagawa, Japan

[73] Assignee: Sony Corporation, Tokyo, Japan

[21] Appl. No.: 416,510

[22] Filed: Apr. 4, 1995

Related U.S. Application Data

[63] Continuation of Ser. No. 54,303, Apr. 30, 1993, abandoned.

[30] Foreign Application Priority Data

May 12, 1992 [JP] Japan .................................. 4-146577
May 13, 1992 [JP] Japan .................................. 4-146203

[51] Int. Cl.$^6$ .................................................. H04N 5/78
[52] U.S. Cl. ........................ 360/9.1; 360/19.1; 360/33.1; 358/335
[58] Field of Search ........................ 360/70, 53, 64, 360/33.1, 36.1, 36.2, 8, 63, 32, 9.1, 18, 19.1; 358/335

[56] References Cited

U.S. PATENT DOCUMENTS

| | | | |
|---|---|---|---|
| 4,346,397 | 8/1982 | Ota ..................................... | 360/33.1 X |
| 4,510,538 | 4/1985 | Sato et al. ............................. | 360/84 |
| 4,633,332 | 12/1986 | Higurashi et al. ..................... | 360/10.3 |
| 4,896,224 | 1/1990 | Tobe et al. ............................. | 360/19.1 |
| 5,168,396 | 12/1992 | Sudoh ..................................... | 360/51 |
| 5,295,024 | 3/1994 | Adachi ..................................... | 360/8 X |
| 5,313,342 | 5/1994 | Soda et al. ............................. | 360/63 |

FOREIGN PATENT DOCUMENTS

| | | |
|---|---|---|
| 0102600 | 3/1984 | European Pat. Off. . |
| 0179920 | 5/1986 | European Pat. Off. . |
| 0211339 | 2/1987 | European Pat. Off. . |
| 0454408 | 10/1991 | European Pat. Off. . |

*Primary Examiner*—Andrew L. Sniezek
*Attorney, Agent, or Firm*—William S. Frommer

[57] ABSTRACT

An apparatus selectively operable for reproducing digital information signals recorded in accordance with a first format in relatively long tracks extending obliquely across a first effective recording width of a first magnetic tape, or for reproducing analog information signals recorded on a second magnetic tape in accordance with a second format in relatively short tracks extending obliquely across a second effective recording width which is narrower than the first effective recording width has a rotary drum around which a magnetic tape selected from the first and second magnetic tapes is wrapped to the same extent, playback heads rotatable with the drum scan obliquely across the first effective recording width of the selected magnetic tape wrapped around the drum so that, if the selected magnetic tape has been recorded in accordance with the first format, the playback heads reproduce the digital information signals while scanning the relatively long tracks, whereas, if the selected magnetic tape has been recorded in accordance with the second format, the playback heads scan beyond the relatively short tracks and thereby reproduce noise after the analog information signals recorded in such short tracks, and, when reproducing a magnetic tape recorded in accordance with the second format, the analog information signals reproduced from the relatively short tracks are time base extended so as to increase the duration thereof for eliminating noise.

8 Claims, 8 Drawing Sheets

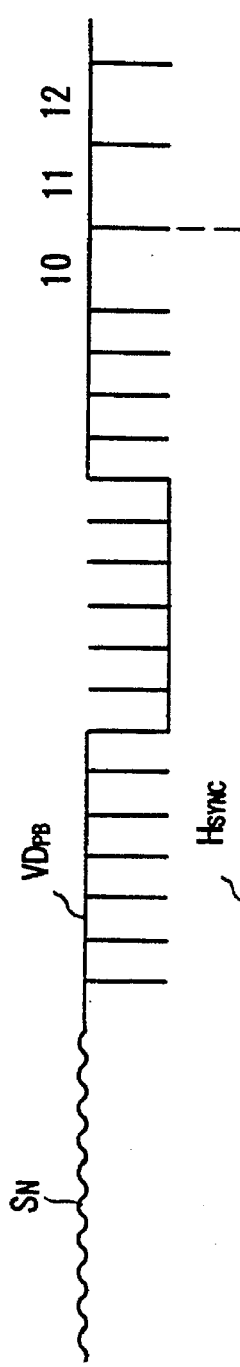
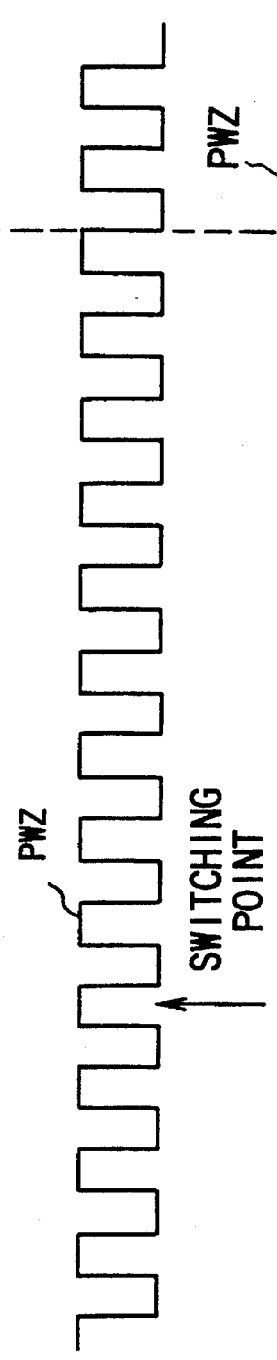
FIG. 10A
FIG. 10B
FIG. 10C
FIG. 10D
FIG. 10E

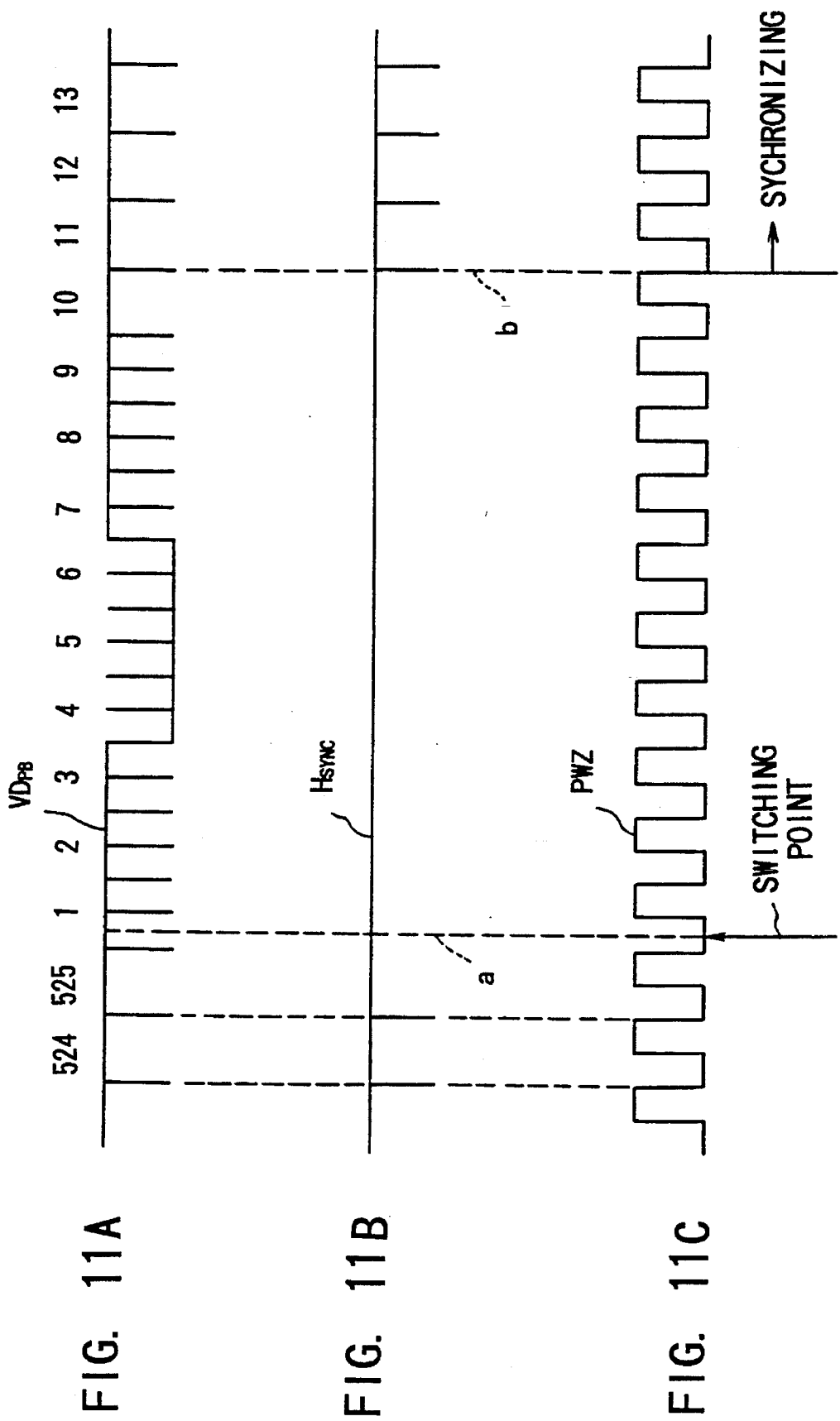

DIGITAL VTR THAT IS ALSO CAPABLE OF REPRODUCING A SIGNAL RECORDED WITH AN ANALOG VTR FORMAT

This application is a continuation of application Ser. No. 08/054,303, filed Apr. 30, 1993 now abandoned.

BACKGROUND OF THE INVENTION

1. Field of the Invention

This invention relates to a method and an apparatus for magnetically recording and/or reproducing video, audio or other information signals, and is suitably applied to a digital VTR which is also capable of reproducing a signal recorded with a different format, for example, the forms used in an analog VTR.

2. Description of the Related Art

Heretofore, when a video tape recorder is employed for recording and reproducing a new recording format in which the track length of the helical recording track is extended compared with the existing recording format, such differences in track length has been coped with by not changing the drum diameter but by changing the wrap angle of the magnetic tape on the drum.

For instance, as shown in FIG. 1, in the case where a new recording format is provided by eliminating one of the longitudinal sound channels $TR_{A1}$ and extending the track length of a helical recording track TR from the existing 180° switching recording format, a wrap angle of the magnetic tape TP on the drum is increased to 180°+α and thus the magnetic tape TP of new recording format can be scanned by heads of the existing drum, that is, without changing the drum diameter or the positions of the heads thereon.

However, if, as described above, we try to cope with the increased track length by increasing the wrap angle, the reproduced signals obtained from two magnetic heads which are in opposing 180 degree relation overlap in time. It becomes impossible to transmit such reproduced signals through a common system and it becomes necessary to have independent rotary transmitters for the drums and subsequent signal processing circuits respectively, and thus, the space factor becomes inefficient and the cost increases.

Also, in the case where the wrap angle is increased as shown in FIG. 2, that is, by changing the path of the magnetic tape TP wrapped around the drum at the exit from the drum DR, if the wrap angle is overly increased, there has been a problem that simple U loading of this tape is not possible in view of the reduced mechanical space between the tape runs to and from the drum.

In practice, in case of reproducing video signals from the magnetic tape while utilizing the drum described above, there are 525 (525/60 systems) or 625 (625/50 systems) horizontal synchronizing signals reproduced during each full turn of the drum. Therefore, pulses synchronized with the reproduced horizontal synchronizing signals and pulses synchronized with the standard horizontal synchronizing signals can be counted and if there is coincidence between the numbers of pulses and horizontal synchronizing signals counted during a full turn of the drum, it can be judged to be normal reproduction.

Furthermore, if the number of reproduced horizontal synchronizing signals counted at the end of a full turn of the drum is an integer, the pulses continue as horizontal synchronizing signals, and it is possible to lock vertical synchronizing signals from the top if the skew is within ±½H as the reproducing field continues further.

It is possible to perform interpolation by counting pulses which are synchronized with horizontal synchronizing signals from the preceding vertical synchronizing signals when the vertical synchronizing signals can not be detected. However, an attempt is made to change the drum diameter in order to solve the problem presented by a change in track length, it is not easy to perform these processes unless there is an integer relation between the number of horizontal synchronizing signals in the standard synchronizing signal system and in the different format of the reproducing system.

SUMMARY OF THE INVENTION

In view of the foregoing, an object of this invention is to provide a magnetic recording and/or reproducing apparatus and method employing rotary heads for recording and reproducing signals on a magnetic tape in accordance with a first format, and which are also capable of at least reproducing signals which have been recorded on a magnetic tape in accordance with a second format.

In accordance with an aspect of the invention, in a magnetic recording and/or reproducing apparatus for recording and reproducing the video, audio or other desired information signals on a helical recording track which, according to a first recording format, is formed in a first effective recording width of the magnetic tape and for at least reproducing similar information signals recorded in a helical recording track which, according to a second recording format, is formed in a second effective recording width narrower than the first effective recording width of the magnetic tape; a drum with rotary heads mounted thereon for recording and reproducing signals on the magnetic tape according to the first recording format is—provided with a bigger diameter than the standard drum diameter for the second recording format, with the ratio of the drum diameters, corresponding to the ratio of the first and second effective recording widths.

Moreover, according to another aspect of the invention, in reproducing the magnetic tape recorded with the second recording format by means of the rotary heads for recording and reproducing the magnetic tape according to the first recording format such rotary heads are made to be movable in the direction of the width of the helical recording tracks in response to a suitable control signal, for example, as in the existing dynamic tracking systems.

Moreover, according to still another aspect of the invention, in reproducing the magnetic tape recorded with the second recording format by means of the rotary heads intended for recording and reproducing the magnetic tape of the first recording format, the reproduced signals obtained from the rotary heads are extended in the time base so that correct reproducing signals will be obtained.

Furthermore, according to yet another aspect of the invention, the first helical recording track has a lead angle almost equal to that of the second helical recording track and is formed in a first effective recording width which is wider than the second effective recording width having the second helical recording track formed therein according to the second recording format, and the magnetic recording and/or reproducing apparatus used for recording and reproducing the prescribed information signals on the magnetic tape according to said first recording format can also be used for at least reproducing the magnetic tape of the second recording format.

Furthermore, according to still another aspect of the invention, the diameter of a drum carrying a rotary head for recording and reproducing the magnetic tape of the first recording format is bigger than a standard drum diameter of the second recording format and the time required for one full turn of the drum is set to be an integer multiple of the horizontal synchronizing signal period of the video signals to be reproduced.

Furthermore, according to still another aspect of the invention, when reproducing the magnetic tape on which the second helical recording track composed of the second recording format is formed, the rotational rate of the drum and the running speed of the magnetic tape are set to be the same as those used when reproducing the first helical recording track composed of the first recording format.

According to the present invention as discussed above, since the diameter of the drum carrying rotary heads for recording and reproducing the magnetic tape of the first recording format formed within the first effective recording width of the tape is selected to be bigger than the standard drum diameter of the second recording format formed within the second effective recording width which is narrower than the first effective recording width, magnetic recording and/or reproducing apparatus and magnetic recording and/or reproducing method which are capable of at least reproducing the magnetic tape of the second recording format can utilize the drum for recording and reproducing the prescribed information signals on the magnetic tape of the first recording format.

Moreover, since the time for a full turn of the drum is set to be an integer multiple of the horizontal synchronizing signal period of video signals to be reproduced, a magnetic recording and/or reproducing apparatus capable of at least reproducing video signals of the magnetic tape of the second recording format can be obtained which utilizes the drum for recording and reproducing video signals on the magnetic tape of the first recording format.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 10A to 10E are signal waveform charts illustrating reproduced video signals in the case where a video signal recorded in an analog VTR format is reproduced by rotary head of the drum of the digital VTR embodying this invention; and FIGS. 11A to 11C are signal waveform charts illustrating signals reproduced normally by the drum of an analog VTR having the recording format of FIG. 5;

DETAILED DESCRIPTION OF THE PREFERRED EMBODIMENTS OF THE INVENTION

Figure 4:
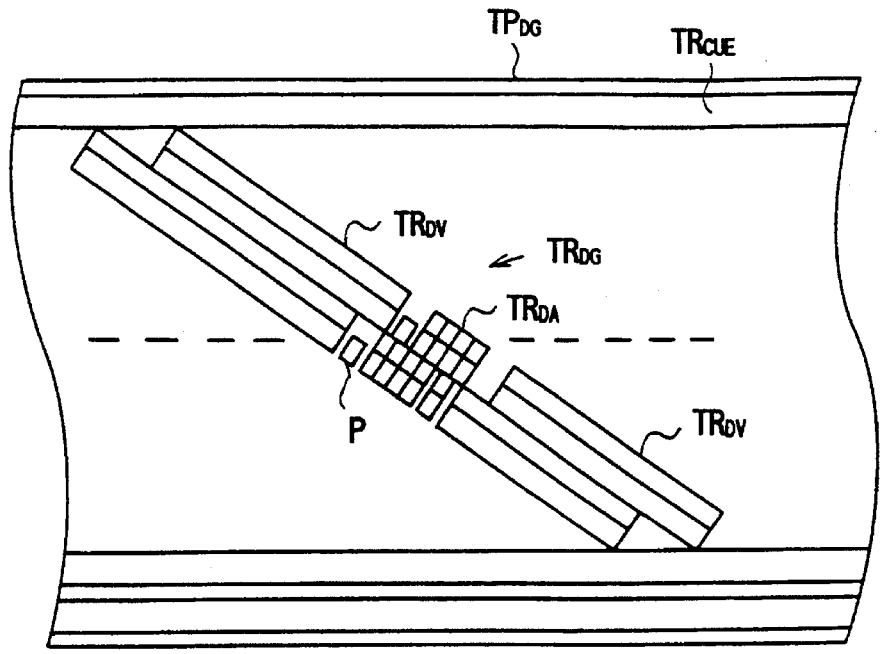
FIG. 4 is a schematic diagram illustrating the recording format for a digital VTR recording and/or reproducing apparatus according to the present invention.
Figure 5:
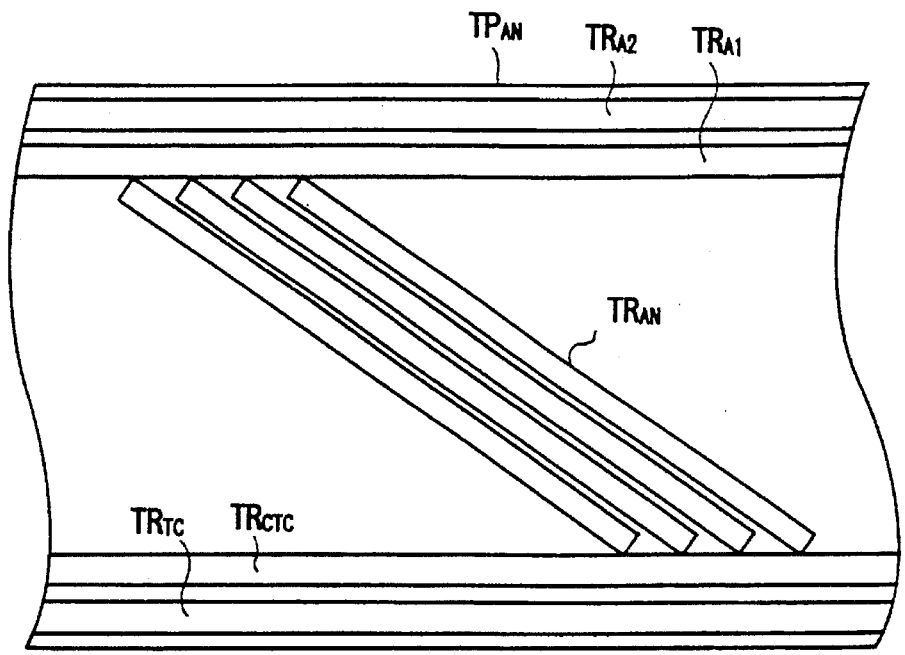
FIG. 5 is a schematic diagram illustrating the recording format for an analog VTR for comparison with the recording format in FIG. 4.

Preferred embodiments of this invention will now be described with reference to the accompanying drawings:
(1) Magnetic Recording and/or Reproducing Method According to a First Embodiment FIG. 4 generally shows a magnetic tape $TP_{DG}$ recorded with a recording format employed in a digital VTR and which, according to the present invention, can also reproduce a magnetic tape $TP_{AN}$ recorded with the conventional analog VTR recording format shown in FIG. 5.

In the illustrated digital VTR recording format (FIG. 4), one of the longitudinal audio recording tracks $TR_{A1}$ and $TR_{A2}$ provided for recording two channels of audio in the analog VTR recording format (FIG. 5) is removed, and the remaining channel $TR_{A2}$ is replaced by a cue track $TR_{CUE}$. By reason of the foregoing, the length of each helical recording track $TR_{DG}$ can be extended over that portion of the tape from which the audio track $TR_{A1}$ has been removed.

Figure 6:
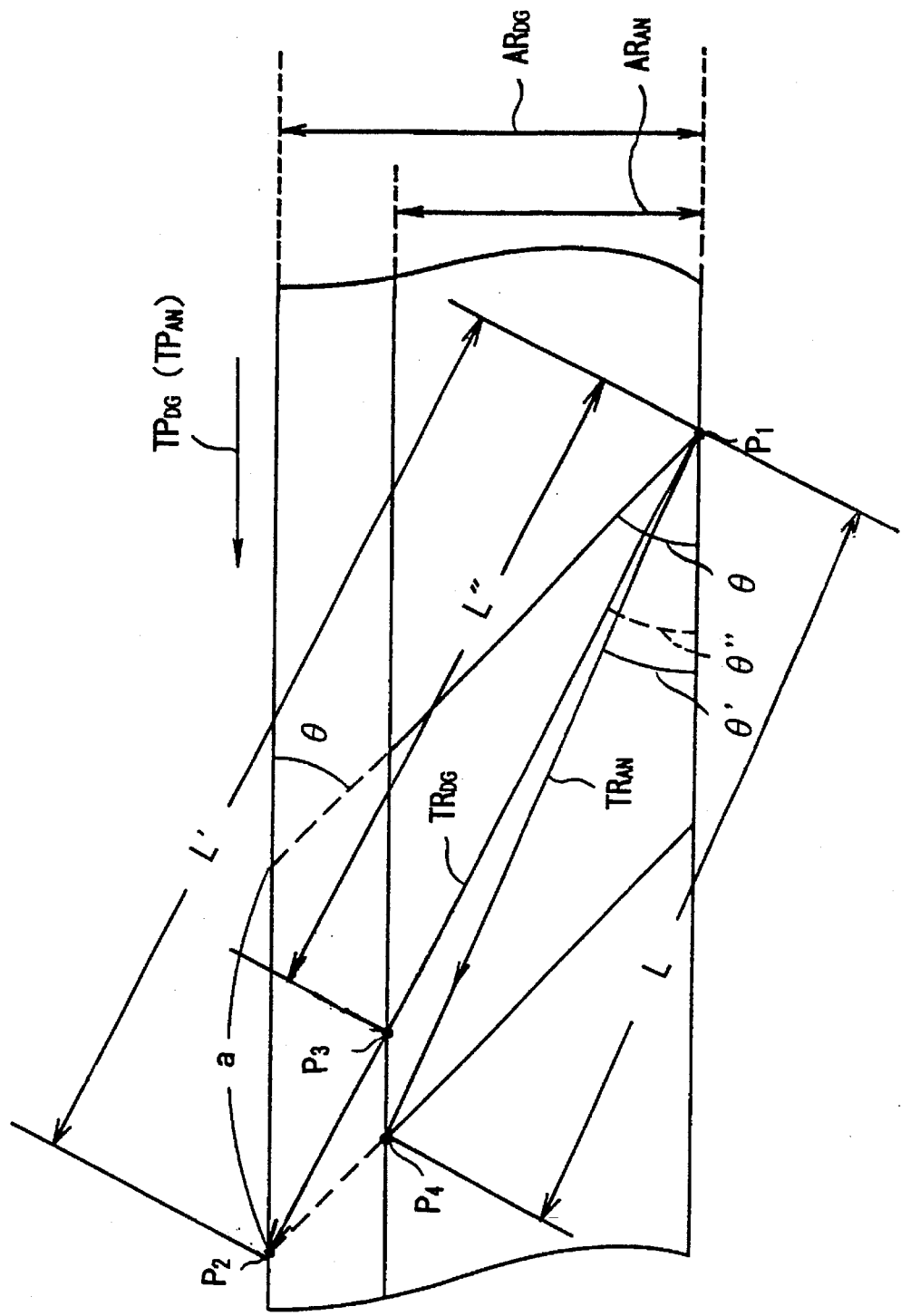
FIG. 6 is a schematic diagram to which reference will be made in explaining how the drum diameter of the digital VTR according to this invention is determined so as to permit also reproducing of a signal recorded with the format of FIG. 5.

Thus, as shown in FIG. 6, in the case of the digital VTR recording format, the effective width $AR_{DG}$ of the tape across which the helical recording track $TR_{DG}$ extends is wider than the effective width $AR_{AN}$ of the type across which the helical recording track $TR_{AN}$ extends in the analog VTR recording format.

Further, in FIG. 6, the length between the point P1 where the magnetic head enters into contact with the tape along the digital VTR helical recording track $TR_{DG}$ and the separating point P2 is indicated at L', the length along the track $TR_{DG}$ within the effective width $AR_{AN}$ of the tape (that is, the distance between the points P1 and P3) is indicated at L", and the length along the analog VTR helical recording track $TR_{AN}$ between the magnetic head contact point P1 and the separating point P4 where the head leaves the analog VTR helical recording track $TR_{AN}$ is indicated at L. If the drum diameter of the analog VTR is d, and the drum diameter of the digital VTR is d', and further if the wrap of the tape about each drum is 180°, the drum diameter d of the analog VTR can be expressed as follows:

$$L = \frac{1}{2} \alpha d \tag{1}$$

Also, the relationship between the track lengths L and L", having a lead angle θ' in the analog VTR and a lead angle θ" in the digital VTR, respectively, may be defined in the following equation:

$$L \sin\theta' = L'' \sin\theta'' \tag{2}$$

$$L'' = \frac{1}{2} \pi d \frac{\sin\theta'}{\sin\theta''} \quad (2A)$$

On the other hand, the drum diameter d' of the digital VTR has the relation expressed in the following equation:

$$L' = \frac{1}{2} \pi d' \quad (3)$$

If the above equation is transformed, the ratio of drum diameters d and d' of the analog VTR and the digital VTR may be selected to be almost equal to the ration of the lengths L" and L' as follows:

$$L'':L' = \frac{1}{2} \pi d \frac{\sin\theta'}{\sin\theta''} : \frac{1}{2} \pi d' \quad (4)$$
$$\doteq \pi d : \pi d' \doteq d : d'$$

In accordance with this embodiment of the invention, the drum diameter d' of the digital VTR is selected to satisfy the following equation:

$$\frac{\pi d}{n} = \frac{\pi d'}{m},$$

in which n is 525 or 625 and m is an integral number $m_1$ or $m_2$, respectively, of horizontal line intervals during a full revolution of the drum.

$$d' = \frac{m}{n} d \quad (5)$$

In order to equalize the 525/60 system and the 625/50 system, that is the system in which there are 525 horizontal lines in each frame and 60 fields per second, and the system in which there are 625 lines in each frame and 50 fields per second, the diameter d' is selected to obtain $m_1$ and $m_2$ to satisfy the following equation:

$$\frac{m_1}{525} = \frac{m_2}{625} \quad (6)$$
$$\frac{m_1}{21} = \frac{m_2}{25} \quad (m_1, m_2 \text{ are integral numbers})$$

In practice, the lead angle θ" of the digital VTR, which is 4.607°, is selected to be almost the same as the lead angle θ' of the analog VTR which is 4.6°. Thus, in utilizing the same drum it is capable of recording and reproducing the magnetic tape $TP_{DG}$ with the digital VTR recording format and it is also capable of reproducing the magnetic tape $TP_{AN}$ recorded with the analog VTR recording format.

In this case, the drum diameter d' of the digital VTR for recording and reproducing with the digital VTR recording format is selected to have the value of, for example, 80.446 [mm] ø, thereby considering the length of the helical recording track and synchronization of video signals to be recorded in place of the standard drum diameter 74.487 [mm]ø used for recording with the analog VTR recording format, and thus ill effects which may occur by increasing the wrap angle of the magnetic tape on the drum for recording or reproducing with the digital VTR format can be prevented in advance.

When reproducing a signal recorded with the analog VTR recording format, the helical recording track may be scanned with the just tracking condition by conventionally utilizing a dynamic tracking head for controlling the magnetic head in the direction of the width of the helical recording track in response to a suitable control signal. However, the given drum diameter [mm]ø is the value selected considering the restoration time of the dynamic tracking head.

Since the lead angle θ" of the helical recording track of the digital VTR recording format is selected to be almost identical with the lead angle θ' of the helical recording track in the analog VTR recording format, magnetic reproducing of the analog VTR recording format can be achieved using the same drum as is used for recording and reproducing in the digital VTR recording format.

(2) Magnetic Recording and/or Reproducing Apparation According to the First Embodiment In practice, when, as described above, the magnetic tape $TP_{AN}$ recorded with the analog VTR recording format is reproduced using the drum with a drum diameter 80.446 [mm]ø, that is, a drum have a larger diameter d' than the drum diameter d used in recording the tape $TP_{AN}$, the time base is compressed and there are reproduced the recorded signal and a signal-less part with loud FM noises being generated in this signal-less part.

Figure 1:
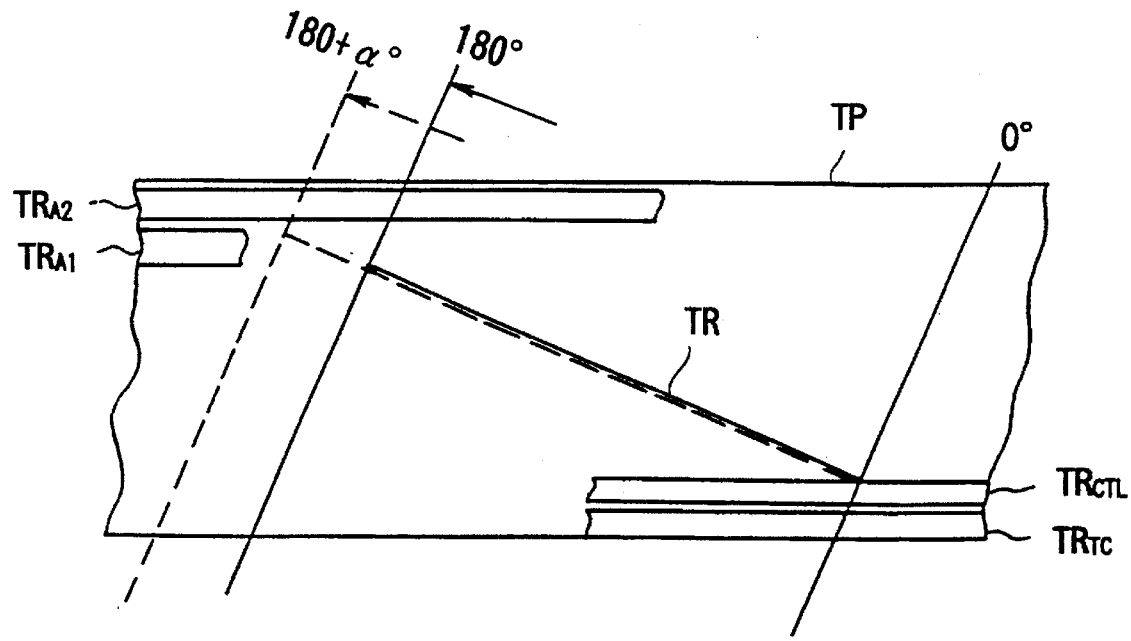
FIG. 1 is a schematic diagram illustrating the extension of a recording track by increasing the effective width of a magnetic tape employed therefor in accordance with the prior art.
Figure 2:
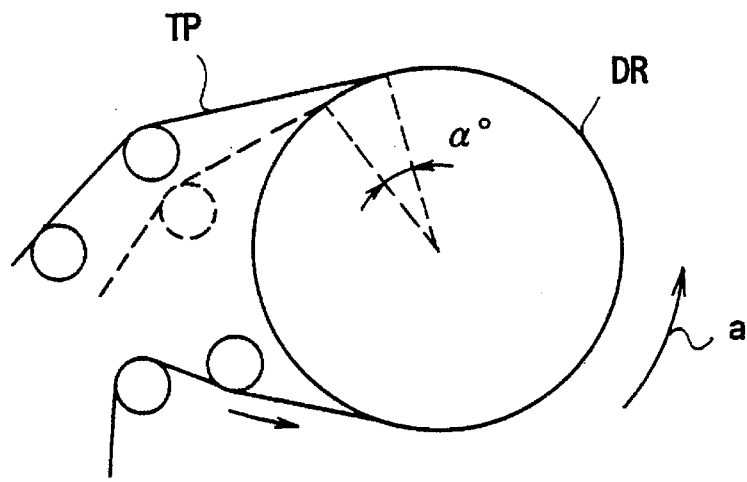
FIG. 2 is a schematic diagram illustrating the manner in which the recording track is extended in accordance with the prior art by increasing the wrap of the magnetic tape about the rotary drum.
Figure 3:
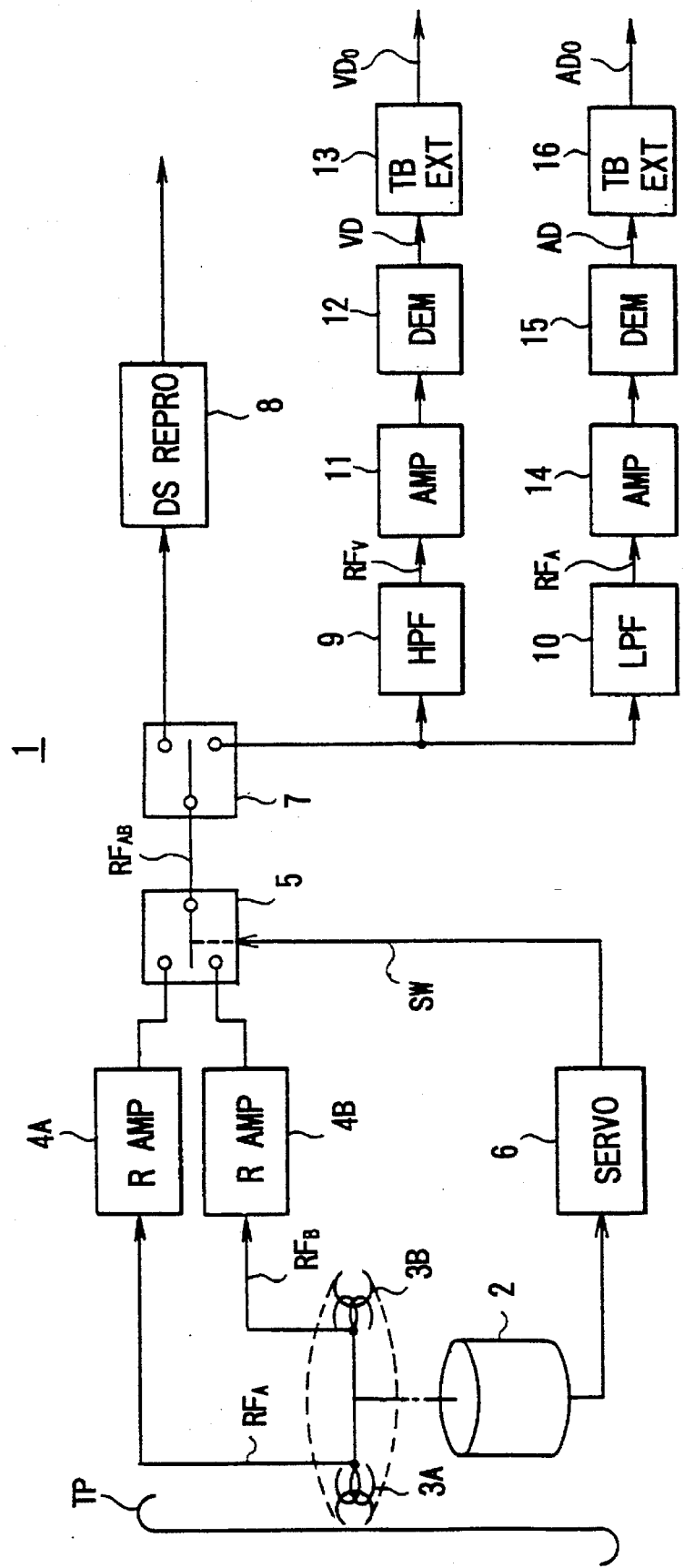
FIG. 3 is a block diagram illustrating an embodiment of a magnetic recording and/or reproducing apparatus according to the present invention.

Thus, a magnetic recording and/or reproducing apparatus 1 according to the invention is constituted as shown in FIG. 3 in order to suppress the noises generated in reproducing the magnetic tape $TP_{AN}$ of analog VTR. More specifically, RF signals $RF_A$ and $RF_B$ (FIGS. 7A and 7B) reproduced from the magnetic tape $TP_{AN}$ by rotary heads 3A and 3B mounted on a drum 2 are amplified by reproducing amplifiers 4A and 4B and then outputted to a first switch circuit 5. Frequency modulated video signals and frequency modulated audio signals are overlap recorded on the magnetic tape $TP_{AN}$.

This first switch circuit 5 switches over signals $RF_A$, $RF_B$ and combines them into a composite RF signal in response to a switch pulse SW (FIG. 7C) generated by a servo circuit 6 which controls rotation of the drum 2, and the resultant composite RF signal $RF_{AB}$ is inputted to a second switch circuit 7.

The second switch circuit 7 selectively outputs the composite RF signal $RF_{AB}$ depending on whether the magnetic tape TP being reproduced has the digital VTR recording format or the analog VTR recording format. In the case of reproducing a tape $TP_{DG}$ with the digital VTR recording format, the composite RF signal $RF_{AB}$ is supplied through switch circuit 7 to a digital signal reproducing circuit 8, but on the other hand, in the case of reproducing a tape $TP_{AN}$ with the analog VTR recording format, the composite RF signal $RF_{AB}$ is supplied through switch circuit 7 to a high-pass filter (HPF) 9 and a low-pass filter (LPF) 10.

Figure 7:
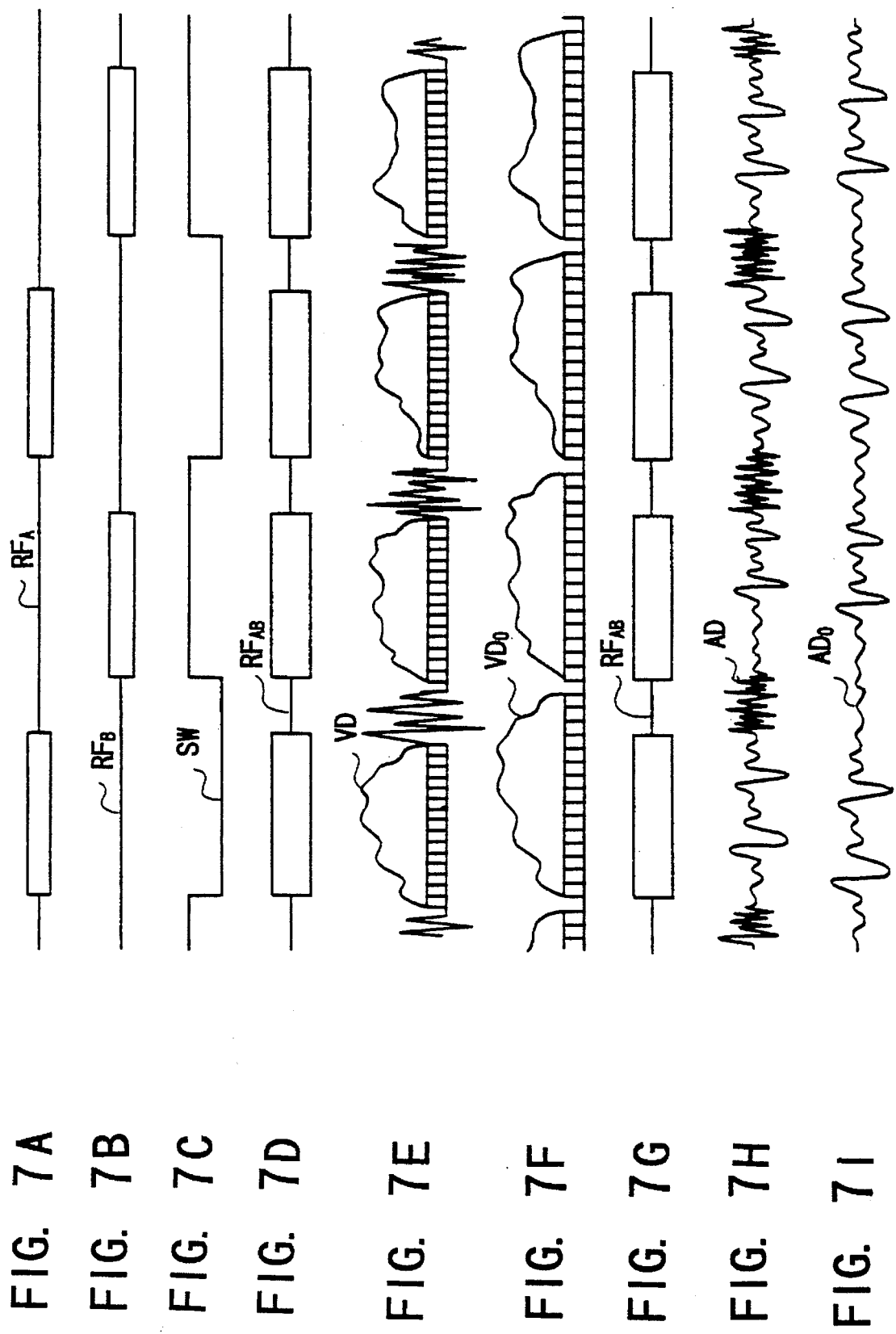
FIGS. 7A and 7I are signal waveform charts illustrating the reproduced signals of various points in the magnetic recording and/or reproducing apparatus of FIG. 3.

This high pass filter 9 extracts video RF signal $RF_V$ from the composite RF signal $RF_{AB}$ (FIG. 7D) and this is amplified by an amplifier 11 and simultaneously equalized and frequency characteristic corrected, whereupon, the amplified video RF signal is demodulated by a demodulator 12. The resulting video signal VD is shown in FIG. 7E to have its time base compressed and to have a large FM noise part in addition to the video part. Therefore, the video signal VD is inputted to a time base extension circuit 13 in which the time base is extended and only the video signal $VD_o$ (FIG. 7F) used at the time of recording is restored and outputted.

This time base extension circuit 13 is of generally conventional construction and generates a write in clock at the timing of the reproduced video signal VD for writing the video signal in a memory and simultaneously converts the video signal VD from analog form to digital form at a rate corresponding to this clock, and reads out the video signal from this memory at the timing of an output clock generated from a correct standard signal and executes digital-to-analog conversion. Thus, the video signal $VD_o$ (FIG. 7F) is time base extended. The time base extension circuit 13, in addition to extending the time base so as to eliminate from the output the noises appearing at the signal-less parts of reproduced signal, can simultaneously correct any jitter that may occur due to a speed error of the magnetic tape or of the rotary head.

Furthermore, the low pass filter 10 extracts the audio RF signal $RF_A$ from the composite RF signal $RF_{AB}$ (FIG. 7G) and this is amplified by an amplifier 14 and demodulated by a demodulator 15. As shown in FIG. 7H, the resulting audio signal AD is time base compressed as described above and the output of the demodulator includes a large FM noise part in addition to the audio part. Therefore, the output of the demodulator 15 is inputted to a time base extension circuit 16 in which the time base of the audio signal AD is extended and the audio signal $AD_o$ (FIG. 7I) used in recording is restored and outputted.

Figure 8:
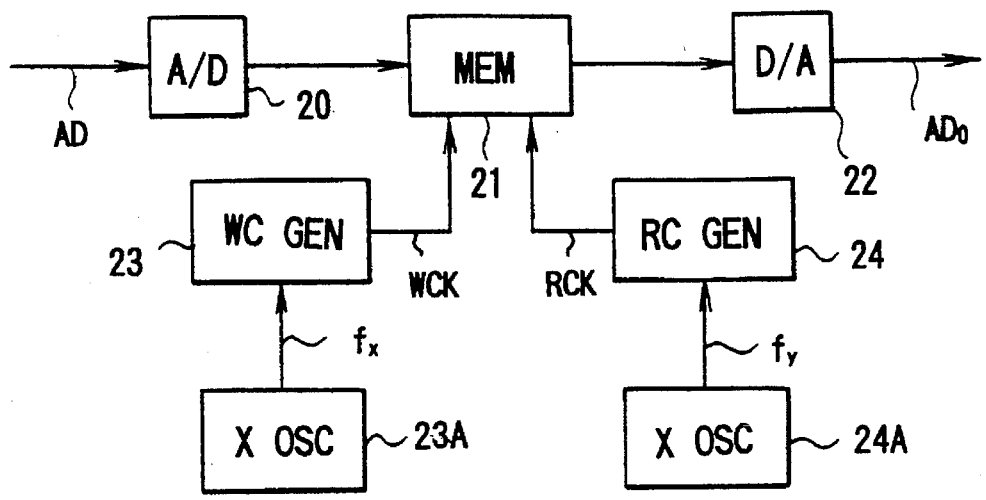
FIG. 8 is a block diagram showing one embodiment of a time base extension circuit included in the magnetic recording and/or reproducing apparatus of FIG. 3.

As shown in FIG. 8, in the embodiment described above with reference to FIG. 3, the time base extension circuit 16 converts the inputted audio signal AD into digital data in an analog-to-digital converter 20 and writes the resulting digital data in a memory 21 at the timing of a write-in clock WCK from a writing clock generating circuit 23, whereupon, digital data is read out at the timing of a read-out clock RCK from a reading clock generating circuit 24. The digital signal read out is converted into an analog signal at a digital-to-analog converter 22 and thus the audio signal $AD_o$ which is time base extended can be obtained.

Since there is no standardized synchronizing signal in the audio signal AD, where X represents the ratio of drum diameter d and d' of the drum at the time of recording and of the drum at the time of reproducing, respectively, the time base of the reproduced signal is compressed by 1/X times. Accordingly, since the time base is extended by X times in the time base extension circuit 16, if frequencies $f_x$ and $f_y$ of X'tal oscillators 23A and 24A, respectively, are determined in order to satisfy the following equation, the time base extension can be performed correctly.

$$\frac{f_y}{f_x} = x \qquad (7)$$

By reason of the foregoing construction, when reproducing a magnetic tape recorded with the analog VTR recording format, using a drum having a drum diameter corresponding to the digital VTR recording format, since the time base is extended and the part from which reproduced signals would be missing is corrected, the magnetic recording and/or reproducing apparatus capable of obtaining reproduced signals corresponding to the recorded signals at the time of recording can be realized.

The vertical synchronizing section of the reproduced video signal $VD_{PB}$ (FIG. 11A) obtained in case of normal reproduction by the analog VTR is shown in FIGS. 11A to 11C as an example for the odd field or field 1 in the 525/60 system. For example, the pulse PWZ (FIG. 11C) synchronized with the horizontal synchronizing signal $H_{SYNC}$ (FIG. 11B) which is referred to as write zero is used as the timing pulse to write-in the video signal in the memory in the time base corrector 13.

The figures show that there are 525 write zero pulses per one full turn of the drum. Since the horizontal synchronizing signal $H_{SYNC}$ does not exist in the vertical synchronizing section, it moves freely from "a" to "b" in the figure, that is, in the interval from the last horizontal synchronizing signal $H_{SYNC}$ of the preceding vertical synchronizing period, and after entering the new vertical synchronizing period, it synchronizes at the 11th line.

The skew occurs at the switching point. However, since the condition does not change if it is within ½ H, it is possible to judge whether it is the normal reproduction or not, or to define what numbered line is being scanned by counting the write zero pulses PWZ. Furthermore, it is possible to interpolate in the case where the vertical synchronizing period could not be detected due to drop out or the like.

As shown in FIGS. 10A to 10E, there exists a signal-less part or noise $S_N$ in the video signal $VP_{PD}$ (FIG. 10A) recorded on an analog VTR and reproduced on a VTR utilizing the drum diameter for the digital VTR according to this embodiment. However, write zero pulses PWZ (FIG. 10C) are generated or run freely within such signal-less part until they are synchronized at the 11th line with the horizontal synchronizing signal $H_{SYNC}$ (FIG. 10B).

At this point, if the write zero pulses have an integral relation to the horizontal synchronizing signal, as in FIG. 10C, the same concept will be applied as in the conventional system by simply changing the count number. However, as shown in FIGS. 10D and 10E, if there is not an integral relation, the write zero pulses PWZ become unstable due to the skew at the 11th line of the horizontal synchronizing signal $H_{SYNC}$.

Accordingly, in the case of this embodiment as described above, the drum diameter d' of the digital VTR recording format will be selected to be a value greater than the standard drum diameter of 74.487 [mm]ø of the analog VTR recording format and which satisfies the condition that the selected drum diameter d' causes the circumference of the drum to be an integer multiple of the distance along the track between the successive horizontal synchronizing signal video signals to be reproduced during a full turn of the drum, in addition to the conditions of equations (4) to (6) as described above, and thus the mentioned ill effects of increasing the wrap angle of the magnetic tape for the drum can be avoided in advance.

According to the foregoing construction, since the drum diameter d' of the drum whereon the rotary head for recording and reproducing the magnetic tape $TP_{DG}$ of the digital VTR recording format is mounted is selected to be bigger than the standard drum diameter d of the analog VTR recording format, and the periodic time of a full turn is set to become an integer multiple of the periodic time of the horizontal synchronizing signal $H_{SYNC}$ of the video signals $VD_{PB}$ to be reproduced, a magnetic recording and/or reproducing apparatus capable of at least reproducing the video signals of the magnetic tape $TP_{AN}$ of the analog VTR recording format can be obtained which utilizes the drum for recording and reproducing the video signals on the magnetic tape $TP_{DG}$ of the digital VTR recording format.

Furthermore, according to the construction as described above, since the drum diameter d' of the digital VTR recording format when used for reproducing the analog VTR recording format is greater than the drum diameter d normally associated with the analog VTR format, the wrap angle can be selected to have various values and thus, the magnetic recording and/or reproducing apparatus can use various systems for loading the magnetic tape on the drum.

(3) Other Embodiments

The embodiment of the invention discussed above has utilized a ratio of write-in and read-out clock signals corresponding to the ratio of the drum diameter at the time of recording to the drum diameter at the time of reproducing in order to extend the time base of the audio signals. However, the write-in and read-out clock signals may be generated with a frequency ratio corresponding to the ratio of the reproduced synchronizing signal and the standard synchronizing signal contained in video signals since the audio signals are time base compressed in the same manner as the video signals.

Figure 9:
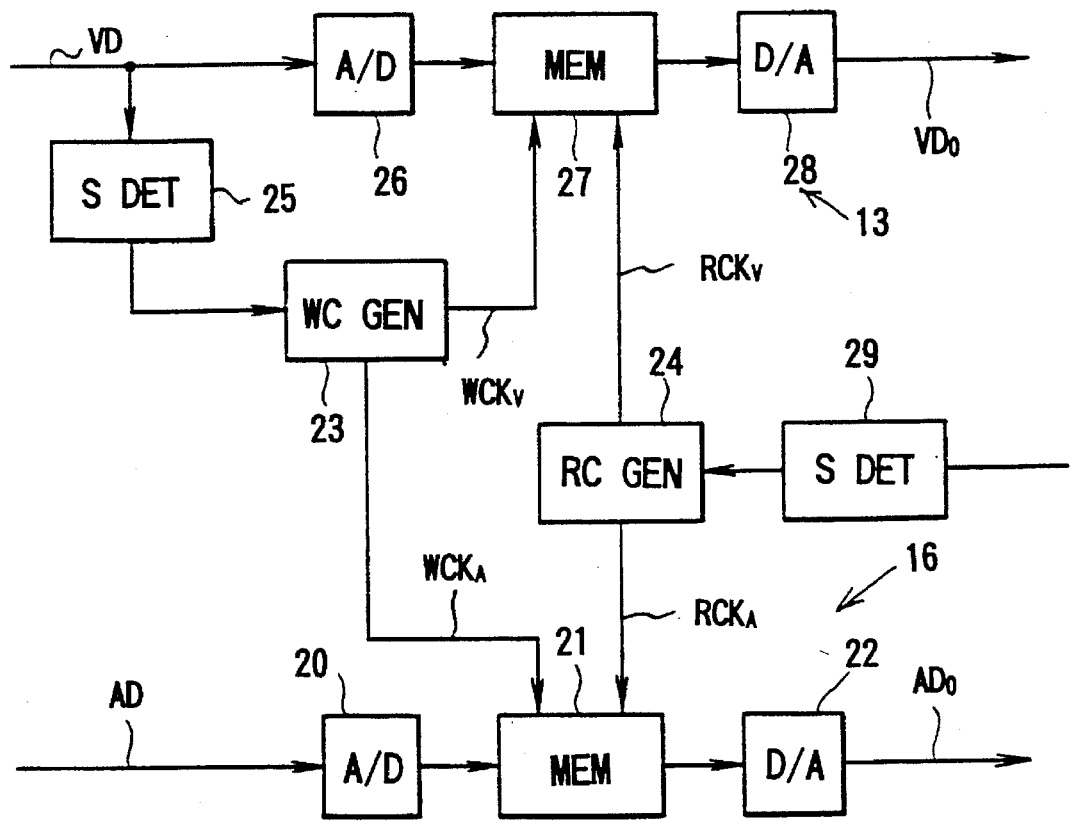
FIG. 9 is a block diagram showing another embodiment of the time base extension circuit.

As shown in FIG. 9, in this case, the synchronizing signal of the reproduced video signal VD is detected at a synchronizing detection circuit 25 and a write-in clock (WCK) generation circuit 23 generates write-in clocks $WCK_V$ and $WCK_A$ of the video signal VD and audio signal AD corresponding to the synchronizing signal and supplies the clocks $WCK_V$ and $WCK_A$ to memories 27 and 21, respectively.

Moreover, the standard synchronizing signal inputted to a synchronizing detection circuit 29 and a read-out clock (RCK) generation circuit 24 generates read-out clocks $RCK_V$ and $RCK_A$ for the video signal VD and the audio signal AD, respectively, corresponding to this synchronizing signal and supplies such clocks to the memories 27 and 21 respectively. Thus, the audio signal AD and video signal VD will be synchronized and the audio signal $AD_o$ and the video signal $VD_o$ which are more accurately time base extended can be outputted.

While preferred embodiments of the invention have been described, it will be obvious to those skilled in the art that various changes and modifications may be affected therein by one skilled in the art without departing from the spirit and scope of the invention, as defined in the appended claims.

What is claimed is:

1. An apparatus selectively operable for reproducing digital information signals recorded in accordance with a first format in first tracks extending obliquely across a reproducing analog information signals recorded on a second magnetic tape in accordance with a second format in second tracks extending obliquely across a second effective recording width which is narrower than said first effective recording width so that said second tracks are shorter than said first tracks, said apparatus comprising:

a rotary drum around which a magnetic tape selected from said first and second magnetic tapes is wrapped to the same predetermined extent;

playback head means on said drum rotatable with the latter for scanning obliquely across said first effective recording width of the selected magnetic tape wrapped to said predetermined extent around the drum so that, if the selected magnetic tape has been recorded in accordance with said first format, said playback head means reproduce only said digital information signals while scanning the length of said first tracks, whereas, if the selected magnetic tape has been recorded in accordance with said second format, said playback-head means scan beyond said second tracks in again scanning the length of the first tracks and thereby reproduce said analog information signals recorded in each of said second tracks followed by a period of noise corresponding to the distance by which each of said second tracks is shorter than said first tracks; and time base extension means operative when reproducing a magnetic tape recorded in accordance with said second format for expanding the duration of said analog information signals reproduced from said second tracks by a time equivalent to said period of noise so as to eliminate each said period of noise.

2. The apparatus as in claim 1; in which said information signals include video signals having a predetermined number of horizontal line intervals recorded in succession along each of said second tracks, and said drum has a diameter selected so that the circumferential distance around the periphery of the drum is an integral multiple of the extent of said horizontal line intervals as recorded.

3. The apparatus as in claim 1; in which said informations signals include video and audio signals; and further comprising a digital signal reproducing circuit and an analog signal reproducing circuit, and change-over means connected between said playback head means and said digital and analog signal reproducing circuits for supplying signals reproduced by said playback head means from said first tracks to said digital signal reproducing circuit and from said second tracks to said analog signal reproducing circuit; said time base extension means including memories for the reproduced video and audio signals, respectively, means for detecting synchronizing signals in said signals reproduced by said playback head means, means responsive to said synchronizing signals, as detected, for controlling writing of the reproduced video and audio signals in said memories therefor, and means for controlling reading from said memories in accordance with a standard synchronizing signal.

4. A reproducing apparatus selectively operable for reproducing digital information signals recorded in accordance with a first format in first tracks extending obliquely across a first effective recording width of a first magnetic tape by means of recording heads on a rotary drum having a predetermined first diameter and around which said first magnetic tape is wrapped to a predetermined annular extent during the recording of said digital information signals in said first tracks, or for reproducing analog information signals recorded on a second magnetic tape in accordance with a second format in second tracks extending obliquely across a second effective recording width which is narrower than said first effective recording width by reason of said second format employing recording heads on a rotary drum having a predetermined second diameter smaller than said first diameter and around which said second magnetic tape is wrapped to substantially said predetermined annular extent during the recording of said analog information signals so that said second tracks are substantially shorter than said first tracks, with the ratio of said first diameter to said second diameter being substantially equal to the ratio of said first effective recording width to said second effective recording width, said reproducing apparatus comprising:

a rotary playback drum having said first diameter and around which a magnetic tape selected from said first and second magnetic tapes is wrapped to said predetermined angular extent;

playback head means on said playback drum rotatable with the latter for scanning obliquely across said first effective recording width of the selected magnetic tape wrapped to said predetermined angular extent around the playback drum so that, if the selected magnetic tape is said first magnetic tape, said playback head means reproduce only said digital information signals while scanning the lengths of said first tracks, whereas, if the selected magnetic tape is said second magnetic tape, said playback head means scan beyond said second tracks in again scanning the length of said first tracks and thereby produce noise for a period after reproducing the analog information signals from each of the scanned second tracks, with said period of noise corresponding to the time during which said playback head means scan beyond said second tracks in scanning said length of the first tracks; and time base extension means operative when said second magnetic tape is selected for expanding the duration of said analog information signals reproduced from said second tracks so as to be concurrent with the time for scanning by said playback head means across said first effective recording width and thereby eliminating each said period of noise.

5. The reproducing apparatus as in claim 4; in which said information signals include video signals having a predetermined number of horizontal line intervals recorded in succession along each of said second tracks, and said first diameter of said playback drum is selected so that the circumferential distance around the periphery of the playback drum is an integral multiple of the extent of said horizontal line intervals as recorded in said second tracks.

6. The reproducing apparatus as in claim 5; in which said first diameter (d') of the playback drum is determined in accordance with the below equation:

$$d' = \frac{m}{n} d$$

in which (d) is said second diameter, (n) is the number of horizontal line intervals in each frame of the video signals, and (m) is said integral multiple of the extent of said horizontal line intervals as recorded in said second tracks.

7. The reproducing apparatus as in claim 5; in which said information signals further include audio signals; and further comprising a digital signal reproducing circuit and an analog signal reproducing circuit, and change-over means connected between said playback head means and said digital and analog signal reproducing circuits for supplying signals reproduced by said playback head means from said first tracks to said digital signal reproducing circuit and from said second tracks to said analog signal reproducing circuit; said time base extension means including video and audio memories for the reproduced video and audio signals, respectively, and means for generating writing and reading clock signals for said audio memory which have respective frequencies $f_x$ and $f_y$ satisfying the following equation:

$$\frac{f_y}{f_x} = x$$

in which x is the ratio of said second diameter to said first diameter.

8. The reproducing apparatus as in claim 6; in which said number of horizontal line intervals in each frame of the video signal is 525 or 625, and said integral multiple (m) of the extent of said horizontal line intervals as recorded in said second tracks which represents said circumferential distance around the periphery of said playback drum is ($m_1$) or ($m_2$), respectively, in accordance with the below equation:

$$\frac{m_1}{21} = \frac{m_2}{25}.$$

* * * * *